(12) United States Patent
Jacob

(10) Patent No.: US 9,762,468 B2
(45) Date of Patent: Sep. 12, 2017

(54) METHOD FOR DYNAMICALLY ADJUSTING PACKET TRANSMISSION TIMING

(71) Applicant: Landis+Gyr Innovations, Inc., Alpharetta, GA (US)

(72) Inventor: John Jacob, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 72 days.

(21) Appl. No.: 14/642,034

(22) Filed: Mar. 9, 2015

(65) Prior Publication Data

US 2016/0269304 A1 Sep. 15, 2016

(51) Int. Cl.
| | |
|---|---|
| H04L 12/26 | (2006.01) |
| H04L 12/801 | (2013.01) |
| H04L 12/825 | (2013.01) |
| H04L 12/841 | (2013.01) |

(52) U.S. Cl.
CPC .......... *H04L 43/0829* (2013.01); *H04L 47/12* (2013.01); *H04L 47/25* (2013.01); *H04L 47/283* (2013.01)

(58) Field of Classification Search
CPC ............................ H04L 47/32; H04L 43/0829
USPC ........................................................ 370/392
See application file for complete search history.

(56) References Cited

U.S. PATENT DOCUMENTS

| | | | | |
|---|---|---|---|---|
| 8,583,053 B1* | 11/2013 | Mahbod | ................ | H04L 1/1825 455/421 |
| 2009/0116420 A1* | 5/2009 | Jeong | ................... | H04B 7/2606 370/312 |
| 2010/0027464 A1* | 2/2010 | Luo | ........................ | H04L 1/0003 370/328 |
| 2011/0090796 A1* | 4/2011 | Bedair | ................ | H04L 65/1053 370/235 |
| 2014/0269269 A1* | 9/2014 | Kovvali | ................ | H04W 24/08 370/229 |
| 2016/0036564 A1* | 2/2016 | Krishnan | ................ | H04L 1/008 714/748 |

FOREIGN PATENT DOCUMENTS

WO 2016144527 9/2016

OTHER PUBLICATIONS

Meiss, "Tsunami: A High-Speed Rate-Controlled Protocol for File Transfer", Retrieved from the Internet: URL:http://steinbeck.ucs.indiana.edu/ mmeiss/papers/tsunami.pdf, 2003, 10 pages.

Oothongsap et al., "Theoretical analysis of the SABUL congestion control algorithm", Telecommunication Systems, vol. 31, No. 2-3, Mar. 1, 2006, pp. 115-139, 25 pages.

(Continued)

*Primary Examiner* — Asad Nawaz
*Assistant Examiner* — Saad A Waqas
(74) *Attorney, Agent, or Firm* — Kilpatrick Townsend & Stockton LLP

(57) ABSTRACT

Systems and methods are disclosed for dynamically adjusting a wait time between packets. The wait time may be increased to improve the packet loss rate. Once increased, the wait time may be decreased if the packet loss rate improves. The packet loss rate is monitored after a predetermined number of packets are sent so that additional adjustments may be made as needed.

12 Claims, 3 Drawing Sheets

(56) References Cited

OTHER PUBLICATIONS

PCT Application No. PCT/US2016/019060, "International Search Report and Written Opinion", May 25, 2016, 13 pages.
Zaghal, "Interactive TCP (iTCP) and Modified-TCP protocols", Prepared for Prof. Javed I. Khan, Department of Computer Science, Kent State University, Nov. 2001, 9 pages.
Zaghal, "Interactive TCP (iTCP) and Modified—TCP protocols;" http://medianet.kent.edu/surveys/IAD01F-itcp/index.html; Nov. 2001, 13 pages.

* cited by examiner

METHOD FOR DYNAMICALLY ADJUSTING PACKET TRANSMISSION TIMING

FIELD OF THE INVENTION

This disclosure relates generally to communication across a network, and more particularly relates to adjusting a time between successive packets in an RF mesh network or other data network.

BACKGROUND

Data networks may be used to communicate data among multiple network devices and may be implemented using a mesh networking topology. There may be times when a large file, such as a firmware update, is transmitted across the network. During a firmware update, the network might become so saturated with packets that a high percentage, e.g., 80% to 90%, of packets fail to reach their destination. The packets that fail to reach their destination have to be retransmitted, with a loss rate that is likely to be similar. In some situations, the wait time between packets is selected to try and address this problem. However, selecting a single value for the wait time is challenging. If the wait time is too long, then the upgrade takes an unnecessarily long time to complete. If the wait time is too short then the percentage of packets that do not reach their destination is too high. If the network traffic varies considerably, then there may not be a single optimum time. Thus, it is desirable to provide systems and methods for improving the efficiency of the transmission of large files across a network.

SUMMARY

Aspects of the invention adjust the wait time between packets based on network conditions and performance. In one instance, the wait time between packets is increased when the packet loss is greater than a packet loss threshold. The packet loss may be determined after a predetermined number of packets are transmitted to a destination device. In addition to increasing the wait time, the system continues to monitor packet loss so it can determine whether to further increase the wait time or to decrease the wait time. Packet loss is checked after a predetermined number of packets are transmitted where the predetermined number is less than the entire amount to be transmitted so that the system can adjust to changing network conditions. The system may further increase the wait time if the packet loss remains below the packet loss threshold. The system may decrease the wait time if the packet loss falls to zero.

The amount that the wait time may be increased or decreased may be based on the percentage of packet loss and a predetermined increment value. The system may consider other factors when determining whether to adjust the wait time or the amount of any adjustment.

These illustrative aspects and features are mentioned not to limit or define the invention, but to provide examples to aid understanding of the concepts disclosed in this application. Other aspects, advantages, and features will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Systems and methods are provided for dynamically adjusting a wait time between successive packets based on the packet loss of a previous transmission. This dynamic adjustment allows for more efficient use of bandwidth based on actual network conditions. The wait time may be adjusted to either increase or decrease the amount of time between packets. The wait time is increased in order to improve the number of packets successfully transmitted or decreased in order to improve the speed of transmission.

Exemplary Operating Environment

Figure 1:
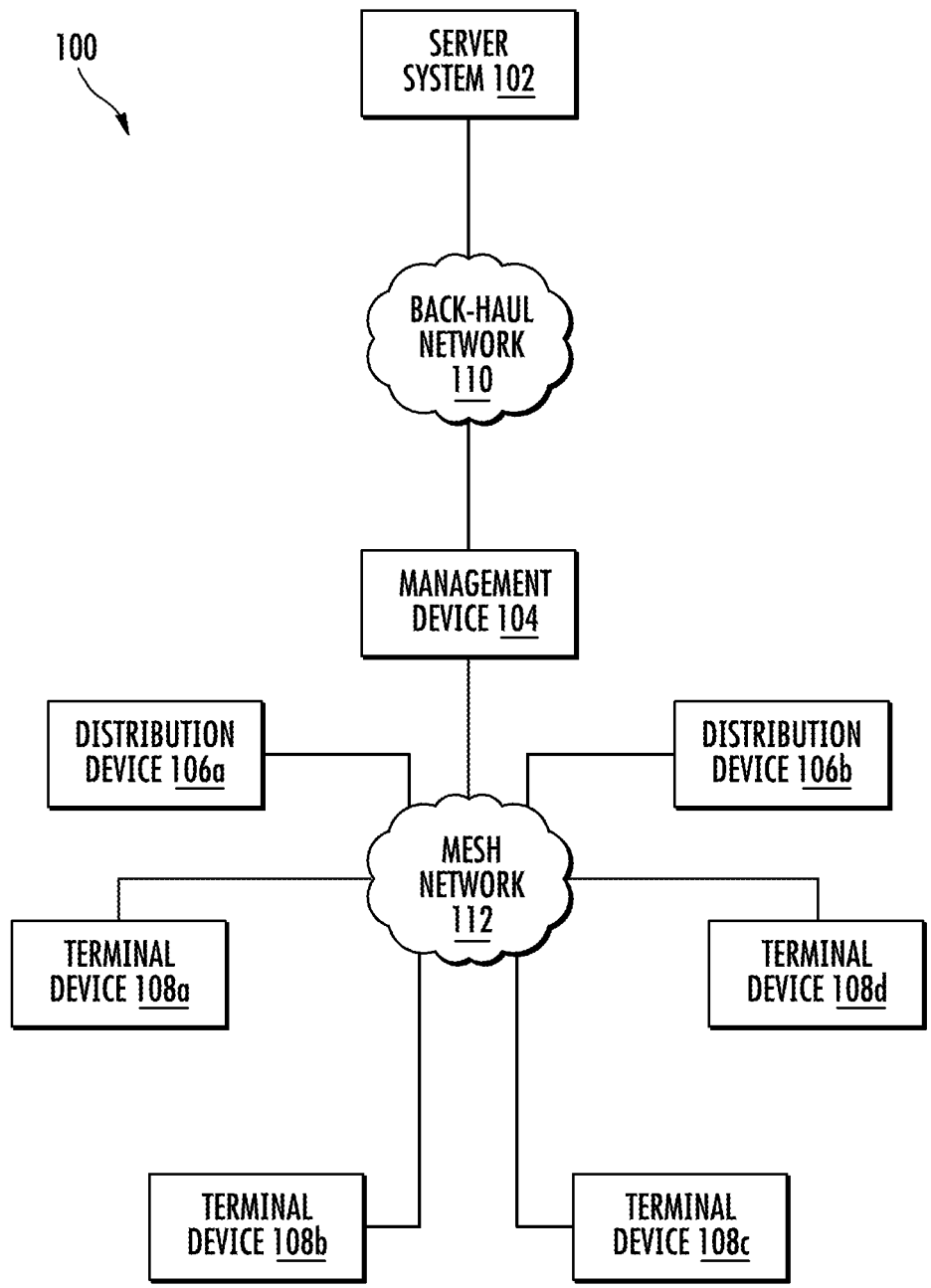
FIG. 1 is a network diagram illustrating a portion of an exemplary mesh network.

Referring now to the drawings, FIG. 1 is a block diagram illustrating a portion of an exemplary system 100. The system 100 can include a server system 102, a network management device 104, distribution devices 106a, 106b, and terminal devices 108a-d. The server system 102 can communicate with the network management device 104 via a back-haul network 110. The network management device 104, the distribution devices 106a, 106b, and the terminal devices 108a-d can communicate via a mesh network 112.

The server system 102 can perform one or more management functions for the system 100. In one non-limiting example, the server system 102 can query the network management device 104 or route a query via the network management device 104 to one or more distribution devices 106a, 106b or to one or more terminal devices 108a-d to determine a status of one or more devices in the mesh network 112. In another non-limiting example, the server system 102 can provide firmware or software updates for one or more devices in the system 100, etc. A non-limiting example of a server system 102 is a head-end system for a distribution network that provides power or other resources to a building, structure, or other geographical area. The server system 102 can include a single computing system, such as a server, or a group of computing systems, such as multiple servers connected in a cloud or grid topology. Although FIG. 1 depicts a single server system 102 for illustrative purposes, a system 100 can include any number of head-end systems. In some aspects, the server system 102 can be omitted and/or one or more functions of the server system 102 can be performed by other devices in the system 100, such as (but not limited to) the network management device 104.

The network management device 104 can communicate data between the server system 102 and the network devices accessible via the mesh network 112. A nonlimiting example of a network management device 104 is a collector device or other device that can aggregate or otherwise collect data obtained by multiple metering devices in a power distribution system. Although FIG. 1 depicts a single network management device 104 for illustrative purposes, a system 100 can include any number of network management devices.

The network management device 104 can communicate with the server system 102 via the back-haul network 110 using any suitable communication medium. Non-limiting examples of suitable communication media include (but are not limited to), Ethernet cable, wireless data communication, power cables for use in power line communication, etc.

Power line communication can include communicating signals via cables used for providing electric power from a utility company to premises in a geographic area.

The back-haul network 110 can include one or more communication links between a core network or backbone network accessible by the server 102 and the mesh network 112. Non-limiting examples of a back-haul network 110 include the Internet, a T1 network, or other suitable data network.

The distribution devices 106a, 106b can communicate data received from the network management device 104 to one another and/or to one or more of the terminal devices 108a-d. Although FIG. 1 depicts two distribution devices 106a, 106b for illustrative purposes, a system 100 can include any number of distribution devices.

The terminal devices 108a-d can perform one or more end-user functions. A non-limiting example of a terminal device is a metering device for monitoring and analyzing consumption of power or other resources by a building or structure. Although FIG. 1 depicts four terminal devices 108a-d for illustrative purposes, a system 100 can include any number of distribution devices. Each of the distribution devices 106a, 106b can communicate with any number of terminal devices 108a-d. For example, a distribution device such as a concentrator may communicate with hundreds or thousands of metering devices or other terminal devices.

Although distribution devices and terminal devices are depicted separately in FIG. 1 for illustrative purposes, other implementations are possible. In some aspects, the same device can include components both for distributing or otherwise relaying messages and for performing one or more end user functions. For example, a concentrator device can include both a radio for distributing or otherwise relaying messages and a processing device for performing one or more end-user functions.

The management functions of the server system 102 may involve transmitting data messages to the distribution devices 106a, 106b using the mesh network 112. In a nonlimiting example, the server system 102 may periodically transmit a firmware update or other software to the network management device 104 for updating the firmware or other software of the distribution devices 106a, 106b or terminal devices 108a-d. The firmware update or other software may have a file size that can be transmitted via the back-haul network 110 without straining the available bandwidth of the back-haul network 110. The file size may be too large to transmit from the network management device 104 to the distribution devices 106a, 106b via the mesh network 112 without straining the network. For example, transmitting a firmware or software update having a size of one megabyte may disrupt the communication of other data via the mesh network 112 that is related to one or more end-user functions of the system 100, such as (but not limited to) communicating power consumption data measured by metering devices. A control unit, such as (but not limited to) the server system 102 or the network management device 104, can divide a one-megabyte file into blocks or portions having sizes that are more suitable for the bandwidth limitations of the mesh network 112 to lessen the strain.

Exemplary Methods for Adjusting Packet Wait Time

Figure 2:
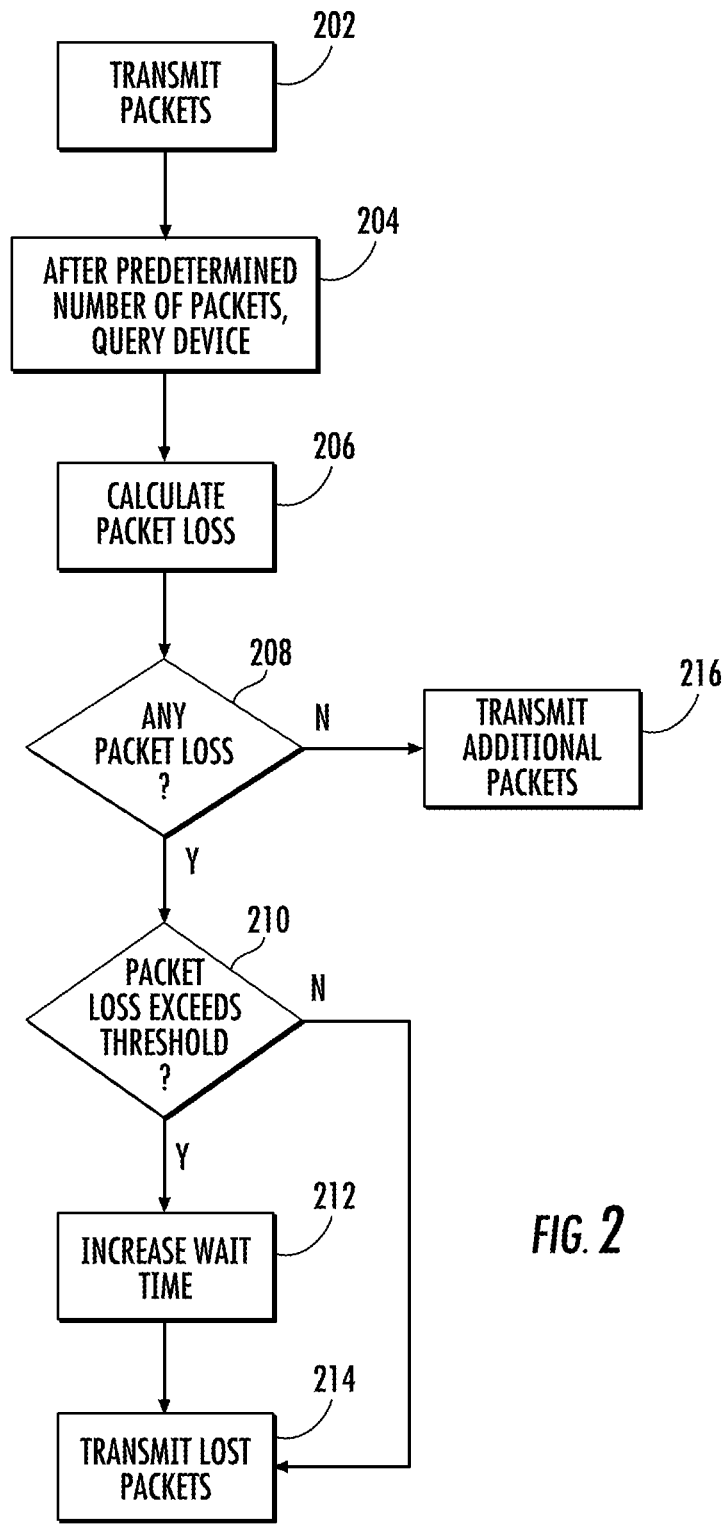
FIG. 2 is a flowchart illustrating one aspect of an exemplary method for adjusting packet wait time.

FIG. 2 is a flowchart demonstrating one aspect of adjusting the wait time between successive packets in order to transmit a large number of packets over a network. In one implementation, a firmware update is transmitted from the head-end system to a network device, such as a concentrator. The firmware may be a large file and may be divided into smaller blocks or portions where each block contains a number of packets. In one example the firmware is over 1 megabyte and each block has 178 packets. In this example, each packet is 768 bytes.

The method illustrated in FIG. 2 may begin after the division into blocks. If so, then in block 202 the packets for one of the blocks are transmitted to the device. The packets may be transmitted using a default value for the packet wait time. After a predetermined number of packets are transmitted, the head-end system queries the device to obtain information about the packets received by the device at block 204. In one example, ten packets are sent before querying the device. The device may respond with a bitmap indicating which packets were received or may respond in another manner that indicates the number of received packets and identifies the received packets. Based on the information received from the device, the head-end system calculates a packet loss value at block 206. If the packet loss value indicates that all packets were received, i.e., there was no packet loss, then the method proceeds from block 208 to block 216 and packets for another block are transmitted using the default value for the packet wait time.

If the head-end system determines at block 208 that there was packet loss, then the amount of the loss is compared to a packet loss threshold at block 210. In one example, the packet loss threshold is 50%. If the packet loss does not exceed the threshold, then the method proceeds to block 214 and the head-end transmits the lost packets using the default wait time.

If the packet loss exceeds the threshold, then the method proceeds to block 212 and the wait time is increased. In one example, the wait time is increased by an amount equal to the packet loss percentage multiplied by a predetermined increment value. In another example, the wait time is increased by a default increment value. In one example, the default wait time is eight (8) seconds and the default increment value is five (5) seconds. Once the wait time is increased, the method then proceeds to block 214 where the lost packets are transmitted using the increased wait time.

FIG. 2 illustrates one instance when the wait time may be increased. Once the lost packets are transmitted at block 214, some of the blocks illustrated by FIG. 2 may be repeated. For example, after a predetermined number of the lost packets are transmitted, the head-end queries the device to obtain information about the packets received by the device. If the head-end determines that there was packet loss, then the head-end determines whether to retransmit the remaining lost packets using the current wait time or using an increased wait time. There may be some limit to the number of times that the wait time may be increased, the maximum number of times that the head-end will attempt to transmit lost packets from a single block, or a maximum wait time.

Figure 3:
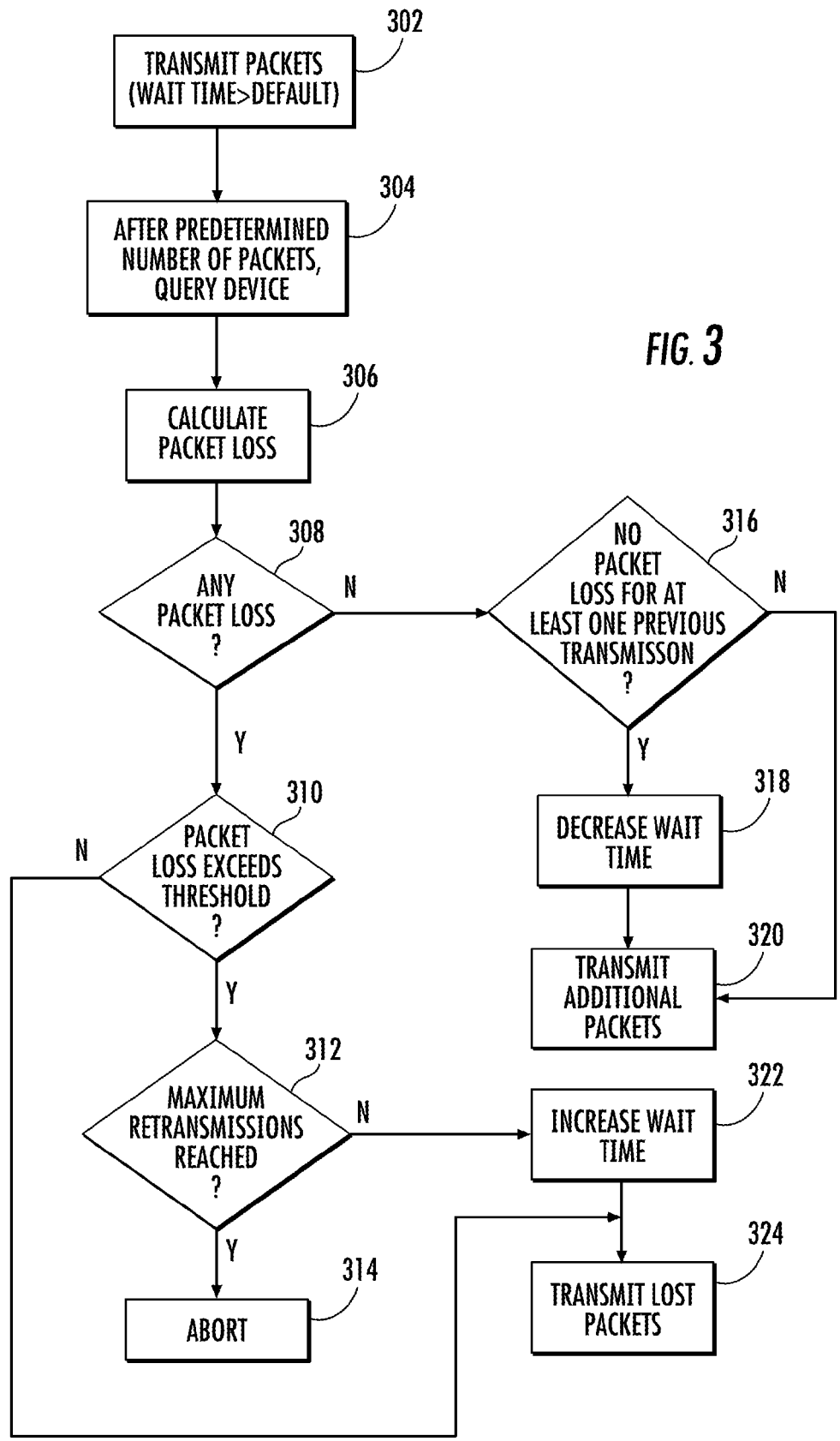
FIG. 3 is a flowchart illustrating another aspect of an exemplary method for adjusting packet wait time.

If the wait time has been increased above the default wait time, then under certain conditions, the head-end system may reduce the wait time. FIG. 3 illustrates this aspect. In block 302 the packets for one of the blocks are transmitted to the device using a packet wait time that is greater than the default value. After a predetermined number of packets are transmitted, the head-end system queries the device to obtain information about the packets received by the device at block 304. Based on the information received from the device, the head-end system calculates a packet loss value at block 306. If the packet loss value indicates that all packets were received, i.e., there was no packet loss, then the method proceeds from block 308 to block 316. In the implementation illustrated by FIG. 3, the head-end requires that at least two blocks be transmitted without loss. Other systems may have different requirements. At block 316, the head-end determines whether this is at least the second consecutive block transmission without packet loss. If this is at least the second consecutive transmission without packet loss, then the method proceeds to 318 and the wait time is decreased. In one example, the wait time is decreased by an amount that corresponds to the last increase. There may be a limit to how low the wait time may be decreased. In one implementation the limit is the default value, but in other implementations, the limit may be lower than the default value. Once the wait time is decreased, packets for another block are transmitted using the decreased wait time at 320.

If transmission without packet loss has not occurred at least two consecutive times, then the method proceeds to 320 and packets for another block are transmitted using the current wait time. As an alternative to the method illustrated in FIG. 3, the wait time could be decreased after a single successful block transmission. If so, then the method would proceed from block 308 directly to block 318.

If the head-end determines at block 308 that there was packet loss, then the amount of the loss is compared to a packet loss threshold at block 310. If the packet loss does not exceed the threshold, then the method proceeds to block 324 and the head-end transmits the lost packets using the current wait time.

If the packet loss exceeds the threshold, then the method proceeds to block 312 and the head-end determines whether a maximum number of retransmissions for the current block has been reached. In one example, the maximum number is fifteen (15). If the maximum number of retransmission has been reached, then the head-end no longer attempts to transmit the lost packets and the method aborts at 314.

If the maximum number of retransmissions has not been reached, then the method proceeds to block 322 where the wait time is increased. The wait time may be increased by an amount equal to the packet loss percentage multiplied by a predetermined increment value. The method then proceeds to block 324 where the lost packets are transmitted using the increased wait time.

Modifications to the methods illustrated by FIGS. 2 and 3 are possible. For example, some implementations may use a non-zero value for packet loss for determining whether to decrease the wait time. Although not specifically illustrated in FIGS. 2 and 3, there may be additional instances when the method times out or aborts. Some of these situations indicate a problem with the network that cannot be addressed by adjusting the wait time. For example, if the head-end does not receive a response to its query to the destination device or if the packet loss indicates that no packets were received, then the method may abort. If the same packets are always lost, then the method may also abort.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for adjusting a delay time between packets, comprising: for a portion of a plurality of packets: transmitting the portion of the packets to a device using an adjusted delay time, wherein a value of the adjusted delay time was previously adjusted to be greater than a default value based on a previous packet loss value for previously sent packets; after the portion of the packets are sent, querying the device to obtain information on received packets; using the information on the received packets to determine a packet loss value and lost packets for the portion of the packets; when the packet loss value for the portion of the packets is non-zero, then determining whether the packet loss value exceeds a packet loss threshold; when the packet loss value exceeds the packet loss threshold, then determining whether a maximum number of retransmissions has been reached; when the maximum number of retransmissions has not been reached, then determining a second adjusted delay time, wherein a value of the second adjusted delay time is greater than the value of the adjusted delay time; and transmitting the lost packets using the second adjusted delay time;

when the packet loss value for the portion of the packets is zero, then determining whether a packet loss value for at least one previously transmitted portion of the packets transmitted using the adjusted delay value was zero, and when the packet loss value for at least one previously transmitted portion of the packets was zero, then determining a third adjusted delay time, wherein a value of the third adjusted delay time is less than the value of the adjusted delay time, and transmitting a second portion of the packets using the third adjusted delay time.

2. The method of claim 1, wherein the value of the third adjusted delay time is no less than the default value.

3. The method of claim 1, wherein the value of the third adjusted delay time is based on a previous increase.

4. The method of claim 1, wherein a value of the second adjusted delay time is greater than the value of the adjusted delay time by an amount based on the packet loss value and a predetermined increment amount.

5. A method for transmitting a plurality of packets to a device by adjusting a delay time between successive packets, comprising: for a first portion of the packets: transmitting the first portion of the packets to the device using a delay time having a default value;

after the first portion of the packets are sent, querying the device to obtain information on received packets; using the information on the received packets to determine a packet loss value and lost packets for the first portion of the packets;

when the packet loss value exceeds a packet loss threshold, then determining a value for an adjusted delay time, wherein the value for the adjusted delay time is greater than the default value by an amount that is based on the packet loss value and a predetermined increment value; transmitting the lost packets to the device using the adjusted delay time;

after the lost packets are sent, querying the device to determine information on received lost packets; using the information on the received lost packets to determine a packet loss value and remaining lost packets for the lost packets;

when the packet loss value for the lost packets is non-zero, then determining whether the packet loss value exceeds the packet loss threshold, when the packet loss value exceeds the packet loss threshold, then determining whether a maximum number of retransmissions has been reached, when the maximum number of retransmissions has not been reached, then determining a second adjusted delay time, wherein a value of the second adjusted delay time is greater than the value of the adjusted delay time, and transmitting the remaining lost packets using the second adjusted delay time, when the packet loss value for the lost packets is zero, then for a second portion of the packets: transmitting the second portion of the packets using the adjusted delay time; when a packet loss value for the second portion of the packets is zero, then reducing the value of the adjusted delay time.

6. The method of claim 5, wherein reducing the value of the adjusted delay time comprises reducing the value to the default value.

7. The method of claim 5, wherein determining a value for an adjusted delay time, comprises multiplying the packet loss value for the first portion of packets expressed as a percentage and the predetermined increment value.

8. The method of claim 1, wherein information on received packets comprises a bit map indicating which packets of the plurality of packets were received.

9. A system for transmitting a plurality of packets to a device by adjusting a delay time between successive packets, comprising:

a head-end system with a user interface that receives a command to transmit a plurality of packets to a device; and a network device that communicates with the head-end system and that communicates with an endpoint;

wherein the head-end system is operable to: for a first portion of the packets: transmit the first portion of the packets to the device using an adjusted delay time, wherein a value of the adjusted delay time is greater than a default value;

after the first portion of the packets are sent, query the device to obtain information on received packets; use the information on the received packets to determine a packet loss value and lost packets for the first portion of the packets;

when the packet loss value exceeds a packet loss threshold, then determine whether a maximum number of retransmissions have been reached; when the maximum number of retransmissions has not been reached, then determine a second adjusted delay time, wherein a value of the second adjusted delay time is greater than the value of the adjusted delay time; and transmit the lost packets using the second adjusted delay time; when the packet loss value is zero, then determine whether packet losses for two consecutively transmitted portions of the packets are zero; and when packet losses for two consecutively transmitted portions of the packets are zero, reduce the value of the second adjusted delay time.

10. The system of claim 9, wherein the head-end system is operable to determine a value for the second adjusted delay time by multiplying the packet loss value for the first portion of the packets expressed as a percentage and a predetermined increment value.

11. The system of claim 9, wherein information on received packets comprises a bit map indicating which packets of the first portion of the packets were received.

12. The system of claim 9, wherein the device communicates with the head-end system using one type of communication medium and communicates with the end point using the same or different type of communication medium.

* * * * *